(12) United States Patent
Wang et al.

(10) Patent No.: US 10,591,073 B2
(45) Date of Patent: Mar. 17, 2020

(54) RELIEF VALVE STRUCTURE

(71) Applicant: YAMADA MANUFACTURING CO., LTD., Kiryu-shi, Gunma (JP)

(72) Inventors: Yu Wang, Sichuan (CN); Xiaofeng Dong, Sichuan (CN); Hirokazu Inoue, Sichuan (CN)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 0 days.

(21) Appl. No.: 15/776,876

(22) PCT Filed: Dec. 14, 2015

(86) PCT No.: PCT/JP2015/084965
§ 371 (c)(1),
(2) Date: May 17, 2018

(87) PCT Pub. No.: WO2017/103979
PCT Pub. Date: Jun. 22, 2017

(65) Prior Publication Data
US 2018/0335156 A1 Nov. 22, 2018

(51) Int. Cl.
*F16K 17/04* (2006.01)
*F01M 1/16* (2006.01)
(Continued)

(52) U.S. Cl.
CPC .............. *F16K 17/04* (2013.01); *F01M 1/02* (2013.01); *F01M 1/16* (2013.01); *F04C 2/102* (2013.01);
(Continued)

(58) Field of Classification Search
CPC .... F16K 17/04; F16K 17/046; F16K 17/0473; F01M 1/02; F01M 1/16; F04C 2/102; F04C 14/26
See application file for complete search history.

(56) References Cited

U.S. PATENT DOCUMENTS 2,011,333 A * 8/1935 Clifton ................ F16K 17/0433
137/536
4,789,132 A * 12/1988 Fujita ........................ F16K 1/12
137/219
(Continued)

FOREIGN PATENT DOCUMENTS

CN 102878414 A 1/2013
EP 2 546 481 A1 1/2013
(Continued)

OTHER PUBLICATIONS

International Search Report, dated Mar. 1, 2016 (Mar. 1, 2016), 1 page.
(Continued)

*Primary Examiner* — Craig M Schneider
*Assistant Examiner* — Kevin R Barss
(74) *Attorney, Agent, or Firm* — Rankin, Hill & Clark LLP (57) ABSTRACT

A relief valve structure (20) attached to a pump body (10) includes: a first discharge portion (31) for discharging oil when a discharge pressure is a first predetermined pressure; a second discharge portion (32) for discharging the oil when the discharge pressure reaches a second predetermined pressure higher than the first predetermined pressure; a third discharge portion (33) for discharging the oil when the discharge pressure exceeds the first predetermined pressure and reaches the second predetermined pressure or a pressure lower than the second predetermined pressure; and a pressure relief hole (34) for releasing the oil from an area around a valve spring (23). The second discharge portion, the first discharge portion, the third discharge portion, and the pressure release hole are provided in this order between an introduction portion (29) and a spring retaining member (24) when viewed from the introduction portion (29).

9 Claims, 4 Drawing Sheets

(51) Int. Cl.
*F04C 14/26* (2006.01)
*F01M 1/02* (2006.01)
*F04C 2/10* (2006.01)

(52) U.S. Cl.
CPC ............ *F04C 14/26* (2013.01); *F16K 17/046* (2013.01); *F16K 17/0473* (2013.01); *F01M 2001/0238* (2013.01)

(56) References Cited

U.S. PATENT DOCUMENTS

| | | | | |
|---|---|---|---|---|
| 4,815,629 A * | 3/1989 | Tausk | ................... | B65D 39/00 |
| | | | | 220/233 |
| 6,481,458 B2 * | 11/2002 | Hirano | ................... | F01M 1/16 |
| | | | | 137/538 |
| 8,297,307 B2 * | 10/2012 | Kurokawa | .......... | F16K 17/0473 |
| | | | | 137/538 |
| 8,616,857 B2 * | 12/2013 | Kai | ......................... | F01M 1/02 |
| | | | | 123/196 R |
| 8,763,634 B2 * | 7/2014 | Akaishi | ................... | F01M 1/16 |
| | | | | 137/512.5 |
| 10,288,177 B2 * | 5/2019 | Shoji | ................... | F16K 11/0716 |
| 2013/0014838 A1 | 1/2013 | Akaishi et al. | | |

FOREIGN PATENT DOCUMENTS

| | | |
|---|---|---|
| JP | 2010-107036 | 5/2010 |
| JP | 3179934 | 11/2012 |
| JP | 3179934 U | 11/2012 |
| JP | 2013-019365 | 1/2013 |
| JP | 2013-019365 A | 1/2013 |
| JP | 2014-219028 | 11/2014 |
| JP | 2014-219028 A | 11/2014 |

OTHER PUBLICATIONS

Japanese Notification of Refusal dated Aug. 27, 2019, with English Translation, 10 pages.

* cited by examiner

RELIEF VALVE STRUCTURE

TECHNICAL FIELD

The present invention relates to relief valve structures to be attached to oil pumps.

BACKGROUND ART

An internal combustion engine mounted in a vehicle includes rotating shafts such as a crankshaft and a camshaft, bearings that support the rotating shafts, and an oil pump that feeds an appropriate amount of oil to the bearings.

The oil pump has a relief valve. When a discharge pressure becomes higher than a predetermined pressure or a lift pressure (valve opening pressure), oil is released through the relief valve to adjust or keep the discharge pressure to an appropriate value.

The relief valve opens upon the discharge pressure reaching the predetermined pressure or the lift pressure, but this alone may be too simple to control the discharge pressure in some cases. Thus, a relief valve that can be opened or closed in a finer manner has been proposed to date (see, for example, Patent Literature Document 1).

The techniques disclosed in Patent Literature Document 1 will be described with reference to the following drawings.

Figure 4A:
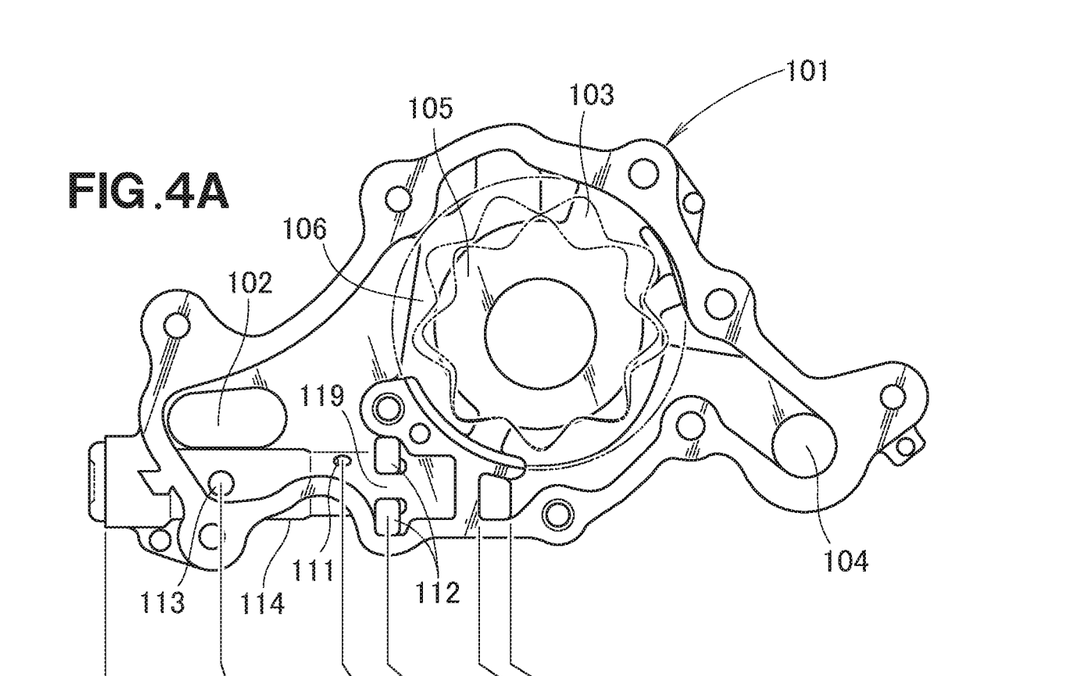
Figure 4B:
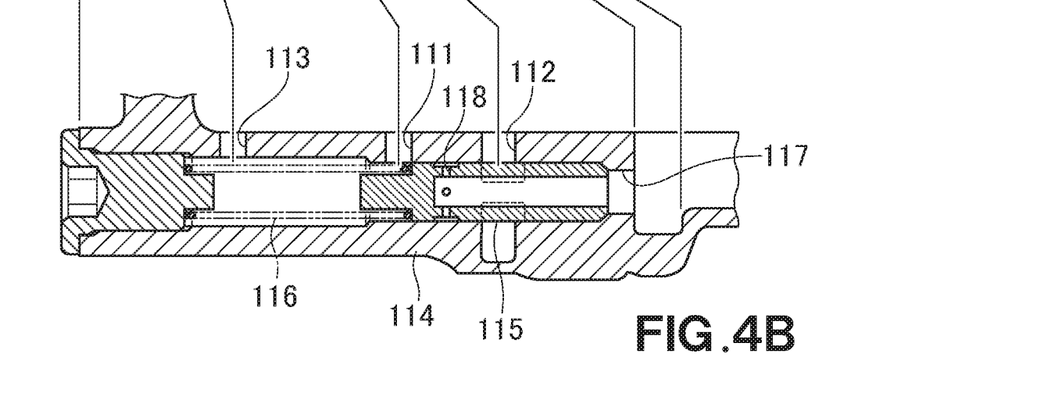

FIG. 4(a) and FIG. 4(b) are views useful to describe a basic configuration of a conventional relief valve structure. As illustrated in FIG. 4(a), an intake port 102, a rotor chamber 103, and a discharge port 104 are formed in a pump body 101.

An inner rotor 105 and an outer rotor 106 that surrounds the inner rotor 105 are received in the rotor chamber 103.

When the inner rotor 105 is rotated directly or indirectly by a crankshaft of an internal combustion engine, the outer rotor 106 rotates along with the inner rotor 105. This rotation produces a change in the volume between the inner rotor 105 and the outer rotor 106. This change generates a pumping action composed of intake, compression, and discharge.

A valve housing 114 disposed toward the back in the drawing is further attached to the pump body 101. A first discharge portion 111, a second discharge portion 112, and a pressure relief hole 113 that each communicate with the inside of the valve housing 114 are provided in the pump body 101.

As illustrated in FIG. 4(b), a spool 115 is received in the valve housing 114 such that the spool 115 can freely move in the valve housing 114, and a valve spring 116 that urges the spool 115 in a predetermined direction is also received in the valve housing 114.

The first discharge portion 111 and the second discharge portion 112 are opened and closed by the spool 115.

The pressure relief hole 113 is a through-hole for preventing the space around the valve spring 116 from becoming tightly closed off and is thus always open.

A discharge pressure acts on a front surface of the spool 115 (a surface opposite to a back surface pushed by the valve spring 116) via a relief inflow portion 117 provided on a side opposite to where the valve spring 116 is disposed.

The spool 115 is a cylindrical body with a bottom (base portion) that opens toward the relief inflow portion 117, and a through-hole 118 penetrating in the radial direction is provided in the cylinder portion.

In FIG. 4(b), the through-hole 118 is closed by the inner peripheral surface of the valve housing 114. Thus, no oil is discharged through the first or second discharge portion 111 or 112, and the relief valve is closed.

As the discharge pressure rises, the front surface of the spool 115 is pushed, and the spool 115 moves in the direction to compress the valve spring 116. When this movement causes the through-hole 118 to coincide with the first discharge portion 111, oil on a discharge side is discharged to an intake side through the through-hole 118 and the first discharge portion 111, and the rise in the discharge pressure is mitigated.

As the discharge pressure further rises, the spool 115 further moves in the direction to compress the valve spring 116. This movement takes the through-hole 118 to a position past the first discharge portion 111. At this time, oil around the valve spring 116 is discharged through the pressure relief hole 113, and thus the movement of the spool 115 is not hindered.

The through-hole 118 becomes closed by the inner peripheral surface of the valve housing 114, no oil is discharged through the first or second discharge portion 111 or 112, and the relief valve enters a closed state. Consequently, the discharge pressure rises rapidly.

As the discharge pressure further rises, the spool 115 further moves in the direction to compress the valve spring 116. This movement takes the front surface of the spool 115 to the position of the second discharge portion 112. Then, oil on the discharge side is discharged to the intake side through the second discharge portion 112, and the rise in the discharge pressure is mitigated.

When oil is to be discharged through the second discharge portion 112, the rise in the discharge pressure may be required to be gentler. In addition, there may be a requirement for a higher accuracy in the lift pressure at which oil is discharged.

If the opening area of the second discharge portion 112 is increased to meet such requirements, in FIG. 4(a), a remaining portion 119 between the two second discharge portions 112 and 112 becomes thin, and the strength of the remaining portion 119 decreases. In addition, if the opening area of the second discharge portion 112 is increased, it becomes difficult to dispose (lay out) the second discharge portion 112.

The second discharge portion 112 is typically formed through cutting or cast coring. The cutting leads to an increased processing cost. The cast coring is advantageous in that the cutting processing cost can be saved, but the dimension precision is more likely to vary. When the dimension precision varies, it becomes difficult to stably secure the remaining portion 119, and it becomes even more difficult to increase the cross-sectional area of the second discharge portion 112. Furthermore, the cast coring leads to a variation in the lift pressure at which oil is discharged, and therefore it becomes difficult to control the oil pressure with high accuracy.

However, as there is a demand that the discharge pressure be further mitigated, a relief valve structure that allows an increased amount of oil to be discharged is being demanded.

LISTING OF REFERENCES

Patent Literature Documents

Patent Literature Document 1: Japanese Patent Application Laid-Open Publication (Kokai) No. 2010-107036

SUMMARY OF THE INVENTION

Problems to be Solved by the Invention

An object of the present invention is to provide a relief valve structure that can further mitigate a rise in a discharge pressure by allowing an increased amount of oil to be discharged and that can reduce a variation in a lift pressure.

Solution to Overcome the Problems

The invention according to Claim 1 provides a relief valve structure to be attached to a pump body.

The relief valve structure includes a valve housing that is formed integrally with the pump body, a spool that is movably received in the valve housing, a valve spring that is received in the valve housing and urges the spool in a predetermined direction, and a spring retaining member that is attached to one end of the valve housing and prevents the valve spring from coming out of the valve housing.

The spool includes a cylindrical portion, a base portion that closes one end of the cylindrical portion and abuts the valve spring, and a through-hole that penetrates the cylindrical portion.

The valve housing includes an introduction portion through which oil is introduced from a discharge side of the pump body, a first discharge portion that communicates with the through-hole when the spool has moved in a direction to compress the valve spring due to the oil introduced through the introduction portion upon a discharge pressure rising to a first predetermined pressure and that allows the introduced oil to be discharged therethrough toward an intake side of the pump body, a second discharge portion that opens when the spool has moved in the direction to compress the valve spring due to the oil introduced through the introduction portion upon the discharge pressure rising to a second predetermined pressure higher than the first predetermined pressure and that allows the introduced oil to be discharged therethrough toward the intake side of the pump body, a third discharge portion that communicates with the through-hole when the spool has moved in the direction to compress the valve spring due to the oil introduced through the introduction portion upon the discharge pressure exceeding the first predetermined pressure and reaching the second predetermined pressure or a pressure lower than the second predetermined pressure and that allows the introduced oil to be discharged therethrough toward the intake side of the pump body, and a pressure relief hole that allows oil around the valve spring to be discharged therethrough toward the intake side of the pump body.

The second discharge portion, the first discharge portion, the third discharge portion, and the pressure relief hole are provided in this order between the introduction portion and the spring retaining member when viewed from the introduction portion.

In the invention according to claim 2, preferably, the second discharge portion is a cast cored hole.

In the invention according to claim 3, preferably, the third discharge portion is a cutout hole (hole made by cutting), and the third discharge portion allows the oil to be discharged therethrough when the discharge pressure exceeds the first predetermined pressure and is below the second predetermined pressure.

In the invention according to claim 4, preferably, the third discharge portion and the second discharge portion allow the oil to be discharged therethrough when the discharge pressure reaches the second predetermined pressure.

Advantageous Effects of the Invention

In the invention according to claim 1, the oil is discharged through the third discharge portion when or before the discharge pressure reaches the second predetermined pressure. The second discharge portion allows the oil to be discharged therethrough when the discharge pressure reaches the second predetermined pressure. Therefore, as the discharge pressure reaches the second predetermined pressure, the oil can be discharged through the second discharge portion as well as through the third discharge portion. The size of the second discharge portion need not be increased unduly (unreasonably, forcibly). Because the size of the second discharge portion can be kept from being increased, the degree of freedom in layout can be increased.

Therefore, the present invention provides a relief valve structure that can further mitigate a rise in the discharge pressure by allowing an increased amount of oil to be discharged.

In the invention according to claim 2, the second discharge portion is a cast cored hole. The second discharge portion may be a cutout hole, but this leads to an increased processing cost. A cast cored hole can render the processing cost unnecessary or can reduce the processing cost.

In the invention according to claim 3, the third discharge portion is a cutout hole. A cutout hole has a higher dimension precision than a cast cored hole. Oil is discharged through the third discharge portion, which has a higher precision, before the oil is discharged through the second discharge portion. Thus, a variation in the lift pressure can be reduced.

In the invention according to claim 4, the oil is discharged from the second discharge portion and the third discharge portion when the discharge pressure reaches the second predetermined pressure. Therefore, a rise in the discharge pressure can be mitigated to a great extent.

BRIEF DESCRIPTION OF THE DRAWINGS

FIG. 1 is a set of views useful to describe a basic configuration of a relief valve structure according to the present invention.

FIG. 2 is a set of views useful to describe an action of the relief valve structure.

FIG. 3 is a set of views useful to describe modified examples of the relief valve structure.

FIG. 4 is a set of views useful to describe a basic configuration of a conventional relief valve structure.

MODE FOR CARRYING OUT THE INVENTION

Hereinafter, embodiments of the present invention will be described with reference to the accompanying drawings. The drawings are to be viewed in the orientations of the reference characters.

Embodiments

Figure 1A:
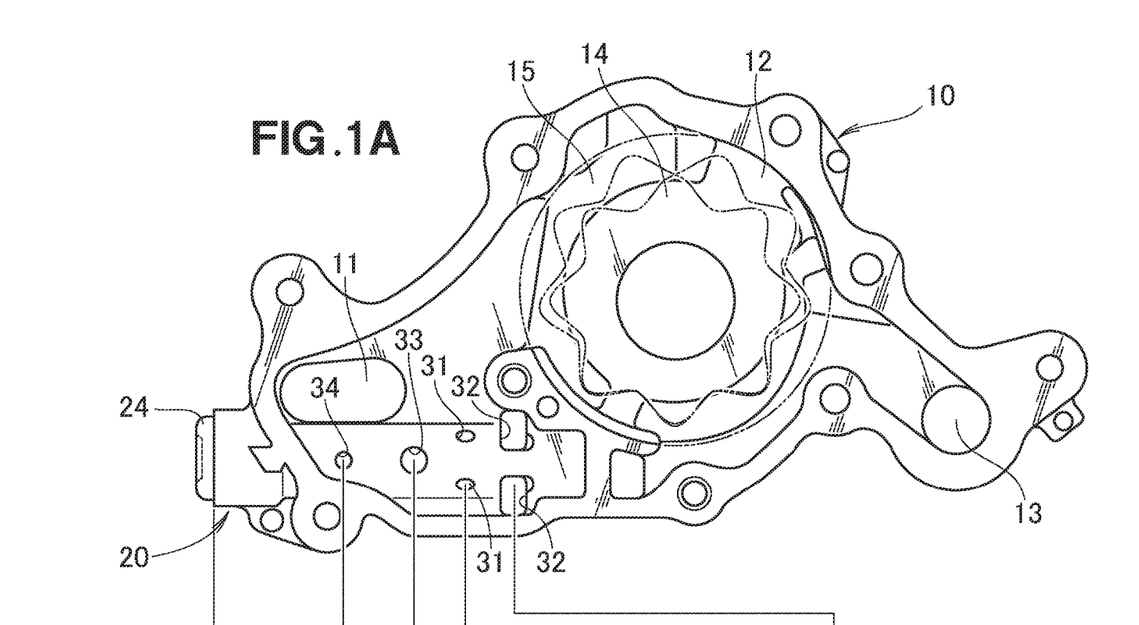

As illustrated in FIG. 1(a), an intake port 11, a rotor chamber 12, and a discharge port 13 are formed in a pump body 10.

An inner rotor 14 and an outer rotor 15 that surrounds the inner rotor 14 are received in the rotor chamber 12. A pump, which has the inner rotor 14 and the outer rotor 15, is referred to as an internal gear pump or a trochoid pump.

When the inner rotor 14 is rotated directly or indirectly by a crankshaft of an internal combustion engine, the outer rotor 15 rotates along with the inner rotor 14. This rotation produces a change in the size of a gap between the inner rotor 14 and the outer rotor 15. This change in the size of the gap generates a pumping action composed of intake, compression, and discharge.

A relief valve structure 20 disposed toward the back in the drawing is further attached to the pump body 10.

Figure 1B:
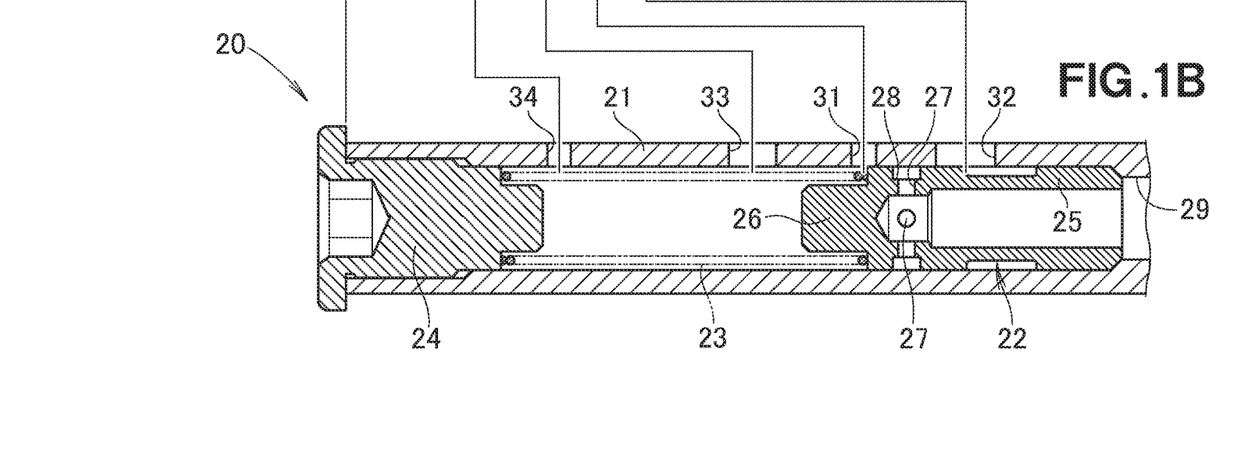

As illustrated in FIG. 1(b), the relief valve structure 20 includes a valve housing 21 that is formed integrally with the pump body 10, a spool 22 that is movably received in the valve housing 21, a valve spring 23 that is received in the valve housing 21 and urges the spool 22 in a predetermined direction, and a spring retaining member 24 that is attached to one end of the valve housing 21 and prevents the valve spring 23 from coming out of the valve housing 21. The spring retaining member 24 may be a screw-in plug, a drive-in plug, a lid member, or any other member that holds one end of the valve spring 23, and the type or the form of the spring retaining member 24 is not limited to particular types or forms.

The spool 22 includes a cylindrical portion 25, a base portion (bottom) 26 that closes one end of the cylindrical portion 25 and is in contact with the valve spring 23, and a through-hole 27 that penetrates the cylindrical portion 25 in the radial direction. An annular groove 28 is provided in an outer peripheral surface of the spool 22, and one end of the through-hole 27 faces the annular groove 28. Thus, the spool 22 is permitted to rotate about a movement axis.

The valve housing 21 includes an introduction portion 29 through which oil is introduced from the discharge port 13 side of the pump body 10. A second discharge portion 32, a first discharge portion 31, a third discharge portion 33, and a pressure relief hole 34 are disposed in this order between the introduction portion 29 and the spring retaining member 24 when viewed from the introduction portion 29.

As illustrated in FIG. 1(a), the second discharge portion 32, the first discharge portion 31, the third discharge portion 33, and the pressure relief hole 34 open toward the intake port 11 of the pump body 10.

An action of the relief valve structure 20 configured as described above will now be described.

For convenience, the spool 22 is said to be at a retraction limit position (most retracted position) when the valve spring 23 is stretched to a maximum within the use range.

Figure 2A:
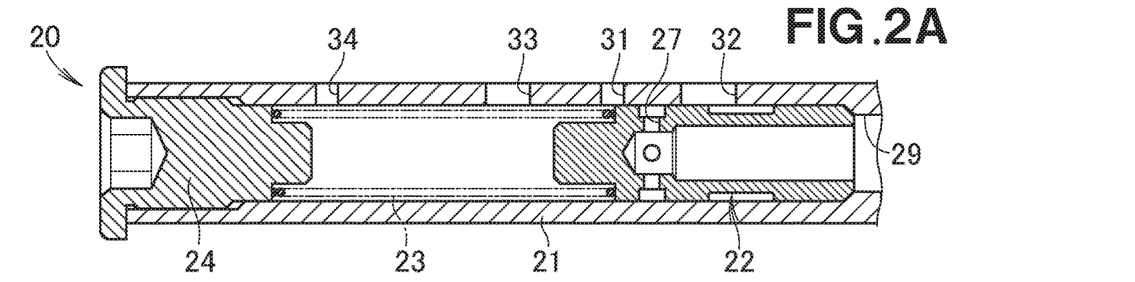

FIG. 2(a) illustrates a case in which the discharge pressure is sufficiently low. The pressure exerted on the spool 22 through the introduction portion 29 is low, and thus the spool 22 is at the retraction limit position due to the urging action of the valve spring 23. When the spool 22 is at the retraction limit position, the through-hole 27 is located between the first discharge portion 31 and the second discharge portion 32 and is closed by the inner surface of the valve housing 21. In other words, the relief valve structure 20 is in a closed-valve state.

As the discharge pressure rises, the spool 22 moves in the direction to compress the valve spring 23.

As illustrated in FIG. 1(b), when the discharge pressure reaches a first predetermined pressure, the through-hole 27 coincides with the first discharge portion 31. Then, oil that has flowed in through the introduction portion 29 is discharged through the through-hole 27 and the first discharge portion 31. This discharge helps the rise in the discharge pressure be mitigated.

As the discharge pressure further rises, the spool 22 further moves in the direction to compress the valve spring 23.

Figure 2B:
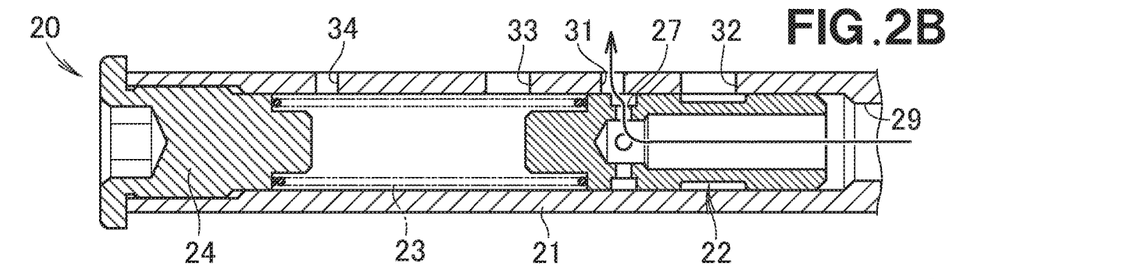
Figure 2C:
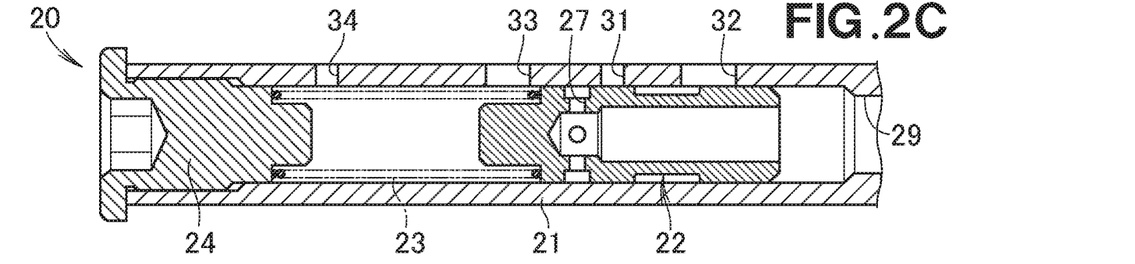

Then, as illustrated in FIG. 2(c), the through-hole 27 comes to a position between the first discharge portion 31 and the third discharge portion 33 and becomes closed by the inner surface of the valve housing 21. In other words, the relief valve structure 20 enters the closed-valve state.

As the discharge pressure further rises, the spool 22 further moves in the direction to compress the valve spring 23.

Figure 2D:
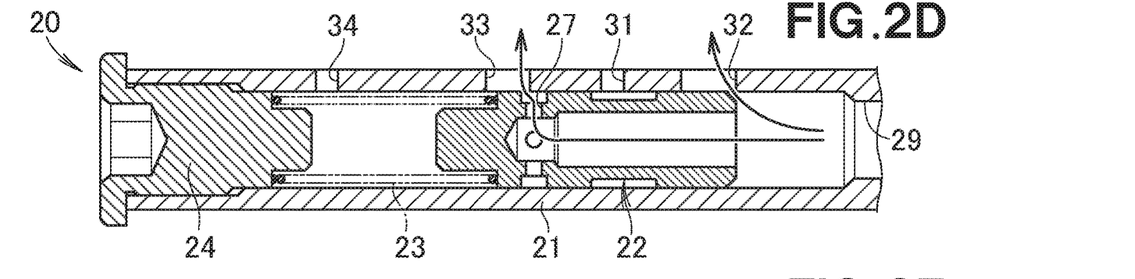

Then, as illustrated in FIG. 2(d), the second discharge portion 32, which has been closed by this point in time, opens, and oil is discharged through the second discharge portion 32. In addition, when the discharge pressure reaches a second predetermined pressure, the through-hole 27 coincides with the third discharge portion 33. Then, oil that has flowed in through the introduction portion 29 is discharged through the second discharge portion 32 and the third discharge portion 33.

In other words, oil is discharged through both the second discharge portion 32 and the third discharge portion 33. This discharge helps the rise in the discharge pressure be further mitigated.

It should be noted that the third discharge portion 33 shown in FIG. 1 may be provided slightly closer than the position shown in FIG. 1 to the first discharge portion 31. Alternatively, the second discharge portion 32 shown in FIG. 1 may be provided slightly closer than the position shown in FIG. 1 to the first discharge portion 31.

With this configuration, upon the discharge pressure exceeding the first predetermined pressure and reaching a pressure lower than the second predetermined pressure, oil can be discharged through the third discharge portion 33.

In a case in which the third discharge portion 33 is a cutout hole, a cutout hole has a higher dimension precision than a cast cored hole. Oil is discharged through the third discharge portion 33, which has a higher precision, before the oil is discharged through the second discharge portion 32. Thus, a variation in the lift pressure can be reduced. In a case in which the second discharge portion 32 is a cast cored hole, constituting the third discharge portion 33 by a cutout hole can reduce a variation in the second predetermined pressure.

Upon the discharge pressure reaching the second predetermined pressure, the oil is discharged through both the third discharge portion 33 and the second discharge portion 32.

Herein, that the oil is discharged through both the third discharge portion 33 and the second discharge portion 32 upon the discharge pressure reaching the second predetermined pressure means as follows. It is ideal to discharge the oil through the third discharge portion 33 and the second discharge portion 32 simultaneously at the second predetermined pressure, but the above statement also includes a case in which the oil is discharged at a slightly higher oil pressure through the third discharge portion 33 than through the second discharge portion 32 until a manufacturing tolerance is compensated.

Conventionally, the oil is discharged through the second discharge portion 32 alone. In the present invention, however, the oil is discharged through both the second discharge portion 32 and the third discharge portion 33. The amount of oil to be discharged can be increased to a great extent. In addition, the second discharge portion 32 need not be increased unduly in size, and thus the second discharge portion 32 can be formed through cast coring, which gives a larger dimension precision tolerance. When the cast coring is employed, a boring process through a mechanical process can be omitted, and the processing cost can be reduced.

In addition, as apparent from FIG. 1(a) and FIG. 1(b), an appropriate distance can be secured between the first discharge portion 31 and the second discharge portion 32, an appropriate distance can be secured between the first discharge portion 31 and the third discharge portion 33, and an appropriate distance can be secured between the third discharge portion 33 and the pressure relief hole 34. Thus, the degree of freedom in disposing the first to third discharge portions 31 to 33 and the pressure relief hole 34 increases.

Furthermore, the area of the second discharge portion 32 having the largest area can be kept from being increased. In this respect as well, the degree of freedom in disposition can be increased.

As the discharge pressure further rises, the spool 22 further moves in the direction to compress the valve spring 23.

Figure 2E:
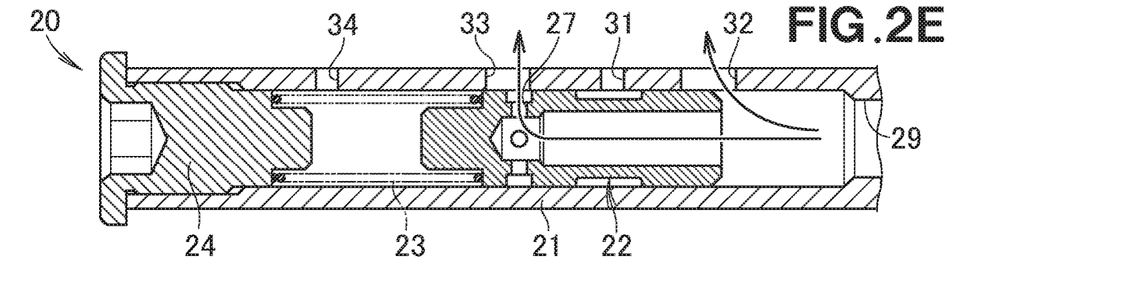

In FIG. 2(e), the oil around the valve spring 23 flows out of the valve housing 21 through the pressure relief hole 34. Thus, the oil around the valve spring 23 is not trapped by the spool 22. In addition, when the spool 22 retracts, the oil outside the valve housing 21 flows in to surround the valve spring 23. Thus, the spool 22 moves smoothly.

As apparent from the foregoing descriptions, the valve housing 21 includes the first discharge portion 31 (FIG. 2(b)) that communicates with the through-hole 27 when the spool 22 has moved in the direction to compress the valve spring 23 due to the oil introduced through the introduction portion 29 upon the discharge pressure rising to the first predetermined pressure and that allows the introduced oil to be discharged therethrough toward the intake side of the pump body 10.

In addition, the valve housing 21 includes the second discharge portion 32 (FIG. 2(d)) that opens when the spool 22 has further moved in the direction to compress the valve spring 23 due to the oil introduced through the introduction portion 29 upon the discharge pressure rising to the second predetermined pressure higher than the first predetermined pressure and that allows the introduced oil to be discharged therethrough toward the intake side of the pump body 10.

Furthermore, the valve housing 21 includes the third discharge portion 33 (FIG. 2(d)) that communicates with the through-hole 27 when the spool 22 has moved in the direction to compress the valve spring 23 due to the oil introduced through the introduction portion 29 upon the discharge pressure exceeding the first predetermined pressure and reaching the second predetermined pressure or a pressure lower than the second predetermined pressure and that allows the introduced oil to be discharged therethrough toward the intake side of the pump body 10.

Referring to FIG. 3, modified examples of the forms of the first to third discharge portions 31 to 33 will be described.

Figure 3A:
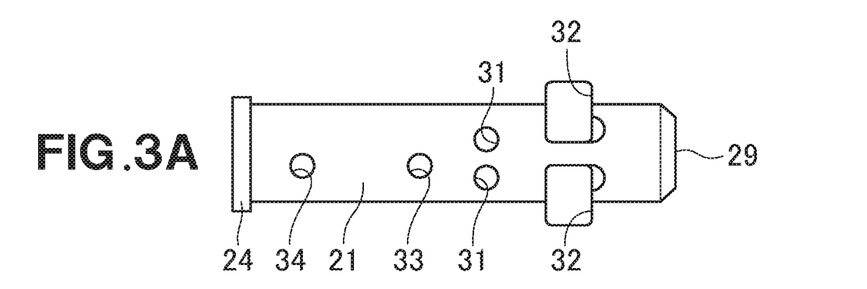

In the example illustrated in FIG. 3(a), the second discharge portion 32, the first discharge portion 31, the third discharge portion 33, and the pressure relief hole 34 are disposed at the positions identical to those illustrated in FIG. 1(b). The second discharge portion 32 is constituted by two rectangular cast cored holes. The first discharge portion 31 is constituted by two circular (round) cutout holes. The third discharge portion 33 is constituted by one circular cutout hole.

Figure 3B:
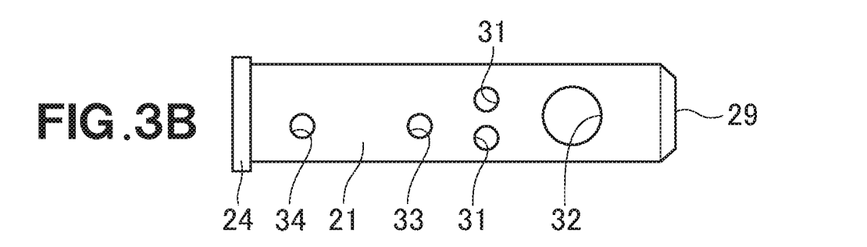

In the example illustrated in FIG. 3(b) as well, the second discharge portion 32, the first discharge portion 31, the third discharge portion 33, and the pressure relief hole 34 are disposed at the positions identical to those illustrated in FIG. 1(b). The second discharge portion 32 is constituted by one circular hole (may be a cast cored hole or a cutout hole). The first discharge portion 31 is constituted by two circular cutout holes. The third discharge portion 33 is constituted by one circular cutout hole.

Figure 3C:
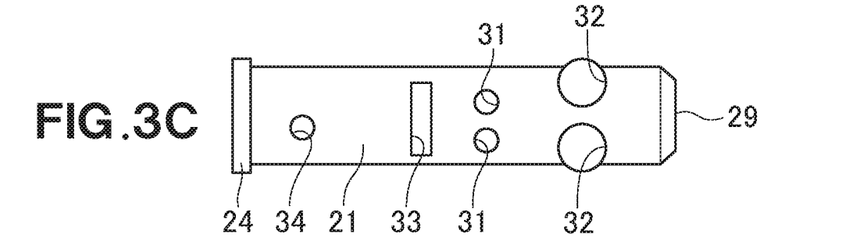

In the example illustrated in FIG. 3(c) as well, the second discharge portion 32, the first discharge portion 31, the third discharge portion 33, and the pressure relief hole 34 are disposed at the positions identical to those illustrated in FIG. 1(b). The second discharge portion 32 is constituted by two circular holes (may be cast cored holes or cutout holes). The first discharge portion 31 is constituted by two circular cutout holes. The third discharge portion 33 is constituted by one rectangular hole (may be a cast cored hole or a cutout hole).

Figure 3D:
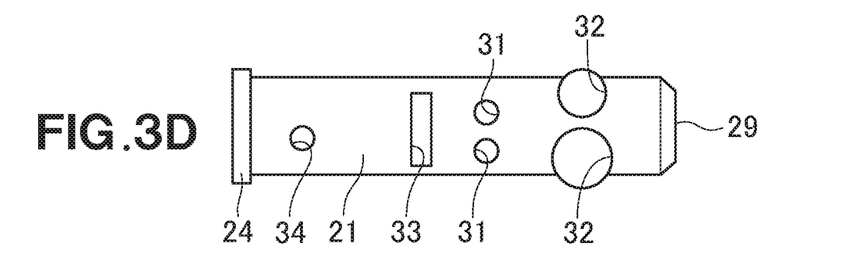

In the example illustrated in FIG. 3(d) as well, the second discharge portion 32, the first discharge portion 31, the third discharge portion 33, and the pressure relief hole 34 are disposed at the positions identical to those illustrated in FIG. 1(b). The second discharge portion 32 is constituted by two circular holes (may be cast cored holes or cutout holes) having different hole diameters. The first discharge portion 31 is constituted by two circular cutout holes. The third discharge portion 33 is constituted by one rectangular hole (may be a cast cored hole or a cutout hole).

In this manner, the shapes, the forms, the sizes, and the manufacturing methods of the first to third discharge portions 31 to 33 can be set as desired. In addition, the first to third discharge portions 31 to 33 and the pressure relief hole 34 are disposed with sufficient intervals therebetween. Therefore, the degree of freedom in disposing the first to third discharge portions 31 to 33 and the pressure relief hole 34 increases.

It should be noted that although the oil pump is a trochoid pump constituted by the inner rotor 14 and the outer rotor 15 in the above-described embodiments, the oil pump may be a gear pump, a roots pump, or other types of pump.

INDUSTRIAL APPLICABILITY

The present invention is suitable for a relief valve structure to be attached to a pump body.

REFERENCE NUMERALS 10 pump body
11 intake port
13 discharge port
20 relief valve structure
21 valve housing
22 spool
23 valve spring
24 spring retaining member
25 cylindrical portion
26 base portion
27 through-hole
29 introduction portion
31 first discharge portion
32 second discharge portion
33 third discharge portion
34 pressure relief hole

The invention claimed is:

1. A relief valve structure to be attached to a pump body, the relief valve structure comprising:
   a valve housing that is formed integrally with the pump body, a spool that is movably received in the valve housing, a valve spring that is received in the valve housing and urges the spool in a predetermined direction, and a spring retaining member that is attached to one end of the valve housing and prevents the valve spring from coming out of the valve housing,
   the spool including a cylindrical portion, a base portion that closes a first end of the cylindrical portion that faces toward the spring retaining member and abuts the valve spring such that the valve spring is disposed between the base portion and the spring retaining member, and a through-hole that penetrates the cylindrical portion, said cylindrical portion having a second end that is open, the valve housing including an introduction portion through which oil is introduced from a discharge side of the pump body and into the cylindrical portion via the open second end of the cylindrical portion, a first discharge portion that communicates with the through-hole when the spool has moved in a direction to compress the valve spring due to the oil introduced through the introduction portion upon a discharge pressure rising to a first predetermined pressure and that allows the introduced oil to be discharged therethrough toward an intake side of the pump body, a second discharge portion that opens when the spool has moved in the direction to compress the valve spring due to the oil introduced through the introduction portion upon the discharge pressure rising to a second predetermined pressure higher than the first predetermined pressure and that allows the introduced oil to be discharged therethrough toward the intake side of the pump body, a third discharge portion that communicates with the through-hole when the spool has moved in the direction to compress the valve spring due to the oil introduced through the introduction portion upon the discharge pressure exceeding the first predetermined pressure and reaching the second predetermined pressure or a pressure lower than the second predetermined pressure and that allows the introduced oil to be discharged therethrough toward the intake side of the pump body, and a pressure relief hole that allows oil around the valve spring to be discharged therethrough toward the intake side of the pump body, the second discharge portion, the first discharge portion, the third discharge portion, and the pressure relief hole being provided in this order between the introduction portion and the spring retaining member when viewed from the introduction portion, and wherein oil is discharged through both the third discharge portion and the second discharge portion.

2. The relief valve structure according to claim 1, wherein the second discharge portion is a cast cored hole.

3. The relief valve structure according to claim 1, wherein the third discharge portion is a cutout hole, and the third discharge portion allows the oil to be discharged therethrough when the discharge pressure exceeds the first predetermined pressure and is below the second predetermined pressure.

4. The relief valve structure according to claim 1, wherein the third discharge portion and the second discharge portion allow the oil to be discharged therethrough when the discharge pressure reaches the second predetermined pressure.

5. A relief valve structure to be attached to a pump body, the relief valve structure comprising:

a valve housing that is formed integrally with the pump body, a spool that is movably received in the valve housing, a valve spring that is received in the valve housing and urges the spool in a predetermined direction, and a spring retaining member that is attached to one end of the valve housing and prevents the valve spring from coming out of the valve housing, the spool including a cylindrical portion, a base portion that closes a first end of the cylindrical portion that faces toward the spring retaining member and abuts the valve spring such that the valve spring is disposed between the base portion and the spring retaining member, and a through-hole that penetrates the cylindrical portion, said cylindrical portion having a second end that is open, said second end being opposite to said first end of the cylindrical portion, said through-hole communicating with an interior of the cylindrical portion at a location between the base portion and the open, second end of the cylindrical portion, the valve housing including an introduction portion through which oil is introduced from a discharge side of the pump body and into the cylindrical portion via the open second end of the cylindrical portion, a first discharge portion that communicates with the through-hole when the spool has moved in a direction to compress the valve spring due to the oil introduced through the introduction portion upon a discharge pressure rising to a first predetermined pressure and that allows the introduced oil to be discharged therethrough toward an intake side of the pump body, a second discharge portion that opens when the spool has moved in the direction to compress the valve spring due to the oil introduced through the introduction portion upon the discharge pressure rising to a second predetermined pressure higher than the first predetermined pressure and that allows the introduced oil to be discharged therethrough toward the intake side of the pump body, a third discharge portion that communicates with the through-hole when the spool has moved in the direction to compress the valve spring due to the oil introduced through the introduction portion upon the discharge pressure exceeding the first predetermined pressure and reaching the second predetermined pressure or a pressure lower than the second predetermined pressure and that allows the introduced oil to be discharged therethrough toward the intake side of the pump body, and a pressure relief hole that allows oil around the valve spring to be discharged therethrough toward the intake side of the pump body, the second discharge portion, the first discharge portion, the third discharge portion, and the pressure relief hole being provided in this order between the introduction portion and the spring retaining member when viewed from the introduction portion, and wherein oil is discharged through both the third discharge portion and the second discharge portion.

6. The relief valve structure according to claim 5, wherein the cylindrical portion interior is open, and the valve spring is retained outside of the open interior of the cylindrical portion.

7. The relief valve structure according to claim 6, wherein the second discharge portion is a cast cored hole.

8. The relief valve structure according to claim 6, wherein the third discharge portion is a cutout hole, and the third discharge portion allows the oil to be discharged therethrough when the discharge pressure exceeds the first predetermined pressure and is below the second predetermined pressure.

9. The relief valve structure according to claim 6, wherein the third discharge portion and the second discharge portion allow the oil to be discharged therethrough when the discharge pressure reaches the second predetermined pressure.

* * * * *